(12) United States Patent
Yeh

(10) Patent No.: US 7,328,640 B2
(45) Date of Patent: Feb. 12, 2008

(54) TURRET TOOL HOLDER FOR A PRESS

(75) Inventor: Edward P. Yeh, Harleysville, PA (US)

(73) Assignee: PEM Management, Inc., Wilmington, DE (US)

( * ) Notice: Subject to any disclaimer, the term of this patent is extended or adjusted under 35 U.S.C. 154(b) by 241 days.

(21) Appl. No.: 11/066,452

(22) Filed: Feb. 28, 2005

(65) Prior Publication Data
US 2005/0257659 A1    Nov. 24, 2005

Related U.S. Application Data

(60) Provisional application No. 60/572,488, filed on May 20, 2004.

(51) Int. Cl.
*B26D 5/08* (2006.01)
(52) U.S. Cl. .............. 83/549; 83/550; 83/552
(58) Field of Classification Search .......... 83/549–552, 83/954, 955, 522.13, 669, 684, 685, 559, 83/213; 483/28, 29
See application file for complete search history.

(56) References Cited

U.S. PATENT DOCUMENTS

| | | | | |
|---|---|---|---|---|
| 1,730,140 A | * | 10/1929 | Havener | ............... 227/57 |
| 3,921,486 A | * | 11/1975 | Valente | ................ 83/420 |
| 4,109,188 A | * | 8/1978 | Shima et al. | ............ 318/602 |
| 4,494,206 A | * | 1/1985 | Imazeki et al. | .......... 700/186 |
| 5,269,739 A | * | 12/1993 | Maynard et al. | ........... 483/29 |
| 5,318,496 A | | 6/1994 | Takahashi | |
| 5,762,594 A | | 6/1998 | Hoppe | |
| 5,845,553 A | * | 12/1998 | Kooken et al. | ............. 83/23 |
| 6,106,446 A | | 8/2000 | Kelly et al. | |
| 6,135,933 A | | 10/2000 | Kelly et al. | |
| 6,163,734 A | * | 12/2000 | Shigefuji et al. | ........ 700/160 |

\* cited by examiner

*Primary Examiner*—Boyer D. Ashley
*Assistant Examiner*—Omar Flores Sánchez

(57) ABSTRACT

A tool-changing system for a press utilizes a rotary turret on which different tools are rigidly fixed. The turret includes a circular table base which is rotatably mounted on top of the press anvil. As the turret is turned, a different tool is moved into the work zone in vertical alignment with the upper tool on the press ram. The turret table can either be manually or motor driven in either direction between indexed operative positions. The indexing system which senses the position of the turret and indexes the turret to its next operating position uses only two simple sensors which are located beneath the turret table. Each sensor reads a different circular track on the underside of the turret table.

9 Claims, 6 Drawing Sheets

```
Table is at a station if A & B are both ON or both OFF

If both A & B OFF, the table is at Station 1 or 3
If both A & B ON, the table is at Station 2 or 4

A is OFF, B is ON when approaching Station 1 or 2
A is ON, B is OFF when approaching Station 3 or 4

If A-OFF, B-ON becomes A & B-OFF then at Station 1
If A-OFF, B-ON becomes A & B-ON  then at Station 2
If A-ON,  B-OFF becomes A & B-OFF then at Station 3
If A-ON,  B-OFF becomes A & B-ON  then at Station 4
```

Fig-6

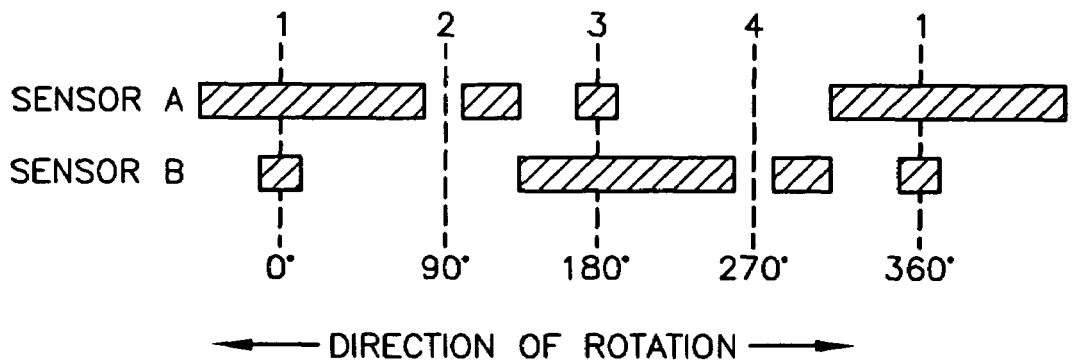

Fig-7

TURRET TOOL HOLDER FOR A PRESS

RELATED APPLICATIONS

The present application is related to provisional patent application Ser. No. 60/572,488 entitled "Turret Tool Holder for a Press" filed on May 20, 2004, priority from which is hereby claimed.

FIELD OF THE INVENTION

The present invention relates to a press used for the insertion of fasteners. More particularly it relates to an apparatus for changing the anvil tooling of an automated press for installing fasteners into panels such as sheet metal.

BACKGROUND OF THE INVENTION

Hydraulic punch presses as shown in FIG. 1 are often used as fastener insertion machines. These presses include a C-type frame 8 and have upper and lower tools 3 and 6 held in vertical alignment which come together on opposite sides of a flat panel workpiece 5 to install a fastener into the workpiece under pressure. The upper tool is carried by a press ram 2 which extends and retracts vertically while the lower tool 6 remains stationary, being affixed to an anvil 9 mounted on the lower jaw of the frame 8 opposite the workpiece 5. The fasteners are typically delivered to the insertion site by escapement means 1 which holds each fastener against the end of the upper tool prior to insertion.

Individual tooling is specifically designed to install a particular type of fastener and since there are fasteners of different types and dimensions, separate tooling is required for installing each type. This therefore requires tooling changes when there is a change of fastener to be installed. It can become particularly problematic when one workpiece requires different types of fasteners. This requires either the tooling to be changed many times for each workpiece or for workpieces to be batched in lots and then re-run with a tooling change between each run. In either case, there are great inefficiencies and the increased opportunity for operator and/or workpiece handling errors.

In order to solve this problem, tool-changing devices have been created for fastener-installing punch presses such as disclosed in U.S. Pat. No. 6,106,446 issued to Kelly et al. and U.S. Pat. No. 6,135,933 issued to Kelly et al. These patents describe a tool-changing device in which a plurality of anvil tools may be interchanged by moving individual tools into and out of a tool clamp on the anvil. This requires rather complicated robotic handling of the individual tools which are delivered to the anvil site from a movable belt or other device that holds the individual tools in separate pockets below the anvil. When a tool is changed, the robotic device lifts the next tool out of a transfer pocket and into a clamp on the anvil to hold it in place. This system is very complex and expensive. More simplified anvil-mounted turret-type tool holders for punch presses are known, however they have no position-sensing means and cannot be used with monitoring controller software.

There is therefore a need in the art for a control system monitored tool-changing mechanism for a punch press which contains only a few components and which is rugged and reliable. Furthermore, there is a need for a rugged and reliable tool-changing system which is economical to manufacture and which provides position sensing means to ensure proper operation of the press.

SUMMARY OF THE INVENTION

In order to meet the above-stated need in the art, the present tool-changing system has been devised. The present device utilizes a rotary turret on which different tools are rigidly fixed. The turret includes a circular table base which is rotatably mounted on the top of the anvil which in turn is attached to the top of the bottom jaw of a C-frame punch press. As the turret is turned, a different tool is moved into the work zone in vertical alignment with the upper tool. The turret table can either be manually or motor driven in either direction between indexed operative positions.

Novel means have been created for sensing the position of the turret and indexing the turret to its next operating position. This indexing system utilizes only two simple sensors which are placed beneath the turret table. The sensors are held in a modular insert which is located within the anvil housing. Each sensor "reads" a different circular track on the underside of the turret table. Magnetic induction sensors are used in combination with grooves on the bottom of the turret table providing an extremely rugged and reliable position-sensing system. The present invention accommodates four tools per turret table, and with the possibility of interchangeable index tables, the invention permits any number of tool choices desired. The indexing system is preferably used in combination with quality assurance operating software which controls the operation of the press according to the selection of the proper tool, the delivery of the appropriate fasteners to the insertion site, and the number of fasteners to be inserted.

More specifically, the applicant has invented a rotary tool holder for a press comprising a press having an anvil including an assembly with means for rotatably mounting a substantially vertical axle. A rotary turret table is affixed to the axle and mounted above the anvil housing assembly. A plurality of vertically-extending tools are rigidly affixed to a top side of the turret table and the turret table is rotatable to a plurality of working positions defined by the points of rotation of the turret table where each of the plurality of tools is positioned directly beneath an upper tool of the press. The anvil assembly includes an index pin engageable with recesses in the bottom surface of the table when the table is in each working position. It also includes magnetic induction sensors responsive to position locating means on a bottom side of the table for indicating a working position of the table. The position locating means are arcuate grooves located along two concentric circular tracks in the bottom side surface of the table and integral with the table. Each of the tools are color-coded by colored panels located on the top side of the turret table adjacent each of the tools. The anvil assembly includes a housing secured to a lower jaw of a C-frame punch press. The system further includes a controller electrically connected to the sensors which pneumatically actuates the index pin into engagement with the recesses in the table when the sensors signal the controller that the table is in one of the working positions.

Greater detail of the invention will be shown in the following drawings which will describe the invention in detail. It should be understood however that there may be modifications and adaptations that will be apparent to those of ordinary skill in the art which fall within the spirit and scope of the invention.

DESCRIPTION OF THE DRAWINGS

FIG. 6 is a table which shows the decoding logic employed by the invention.

FIG. 7 is a timing chart which shows the output of the sensor signals labeled as A and B.

DESCRIPTION OF THE PREFERRED EMBODIMENT

Figure 1:
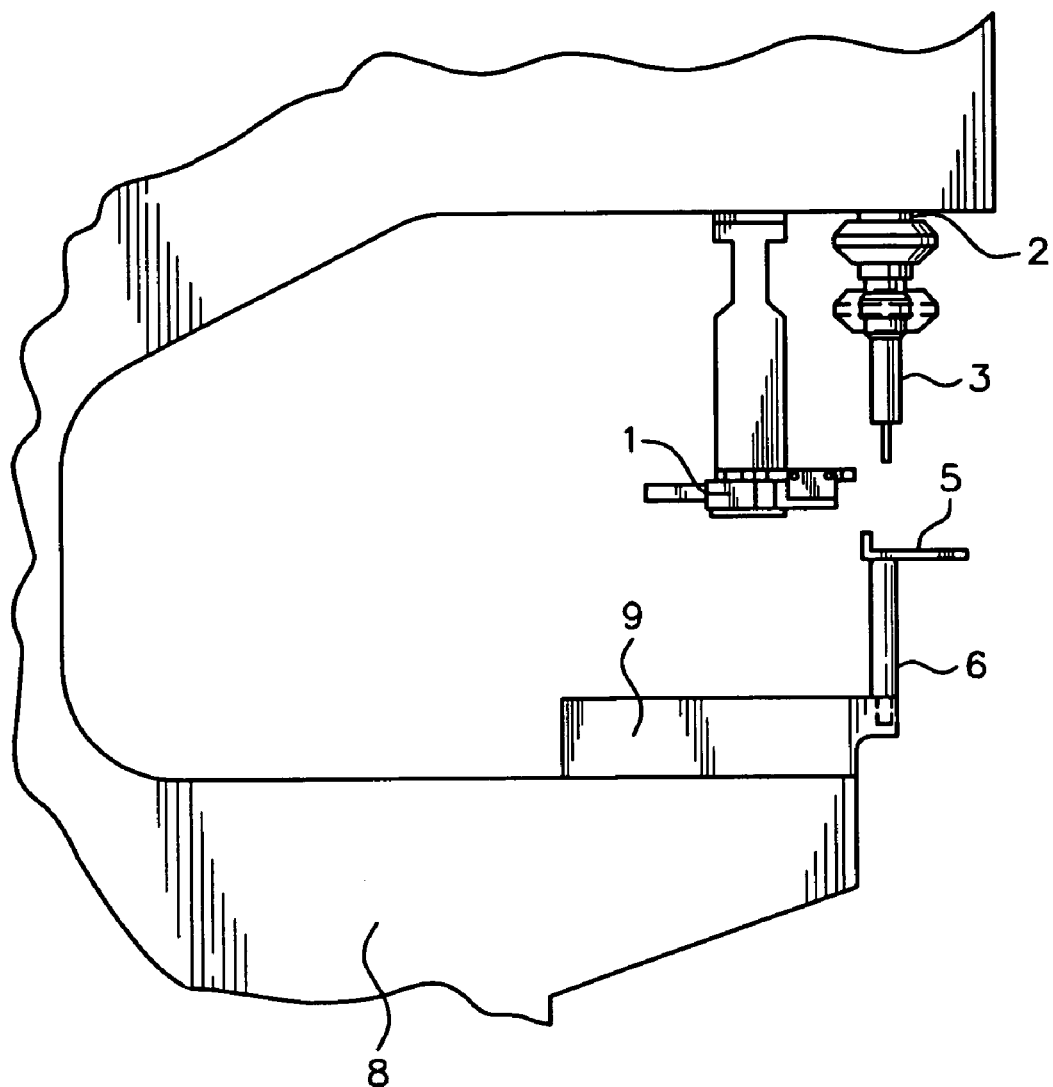
FIG. 1 is an overall view of a prior art punch press.
Figure 2:
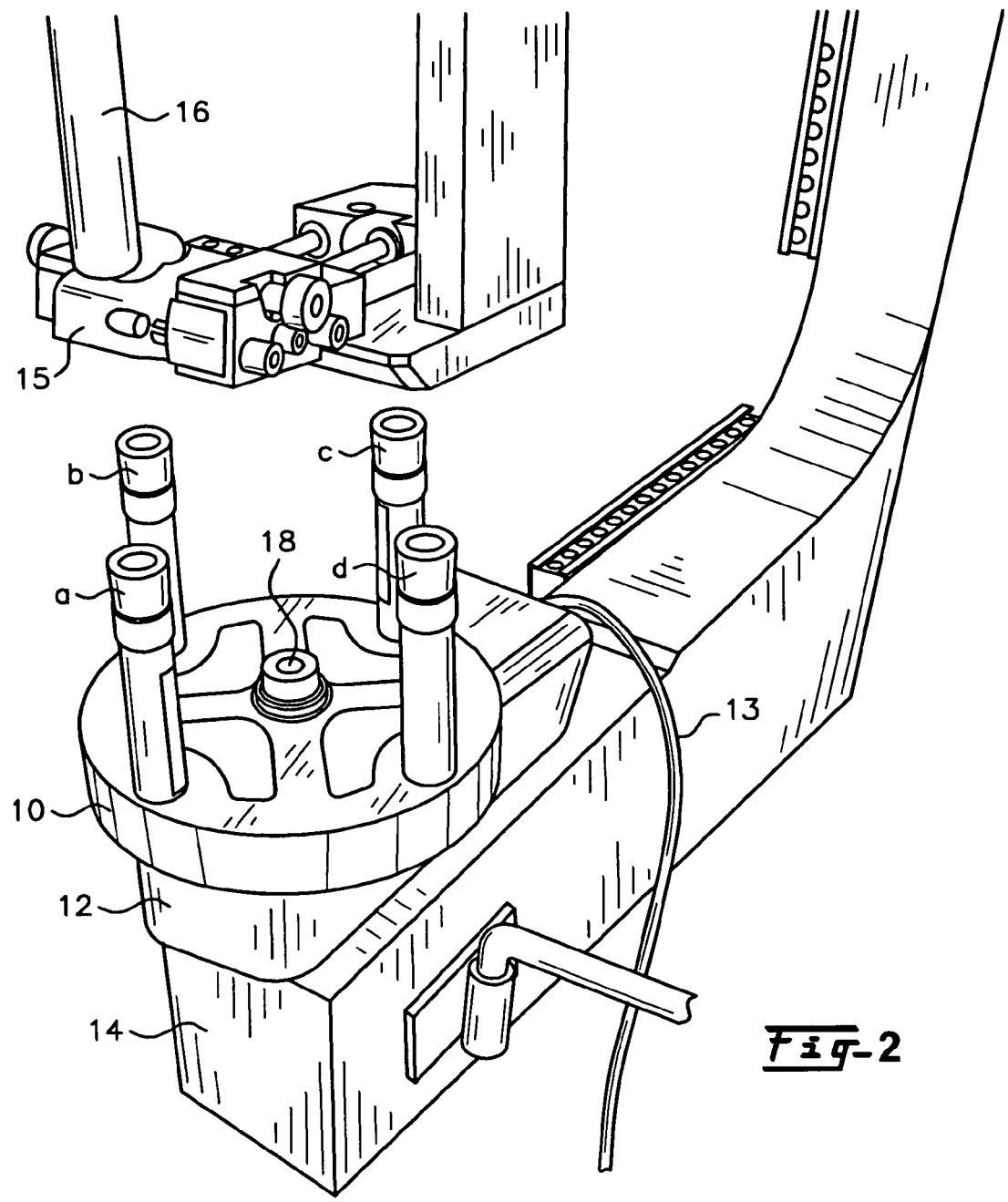
FIG. 2 is a close-up isometric view of the turret table mounting shown with four tools extending vertically from the top of the table.

Referring now to FIG. 2, the turret table 10 which carries four different tools a, b, c, and d is mounted on top of anvil housing assembly 12. The housing is in turn secured to the top of the lower jaw 14 of a C-frame type punch press. As the turret table is rotated, the tools (in this Figure tool a) move to an outermost point which is directly below and in vertical alignment with the upper tool 16. The turret table may be either motor-driven or manually rotated in either direction. The press also includes fastener delivery means and an automated fastener holder 15. The table rotates upon an axis defined by axle 18 which extends below the table and is secured by the anvil housing assembly. Signal wire 13 from the sensors passes from the back of the anvil housing and is connected to appropriate controller software which regulates operation of the machine. The table is preferably composed of a ferro-magnetic material such as steel.

Figure 3:
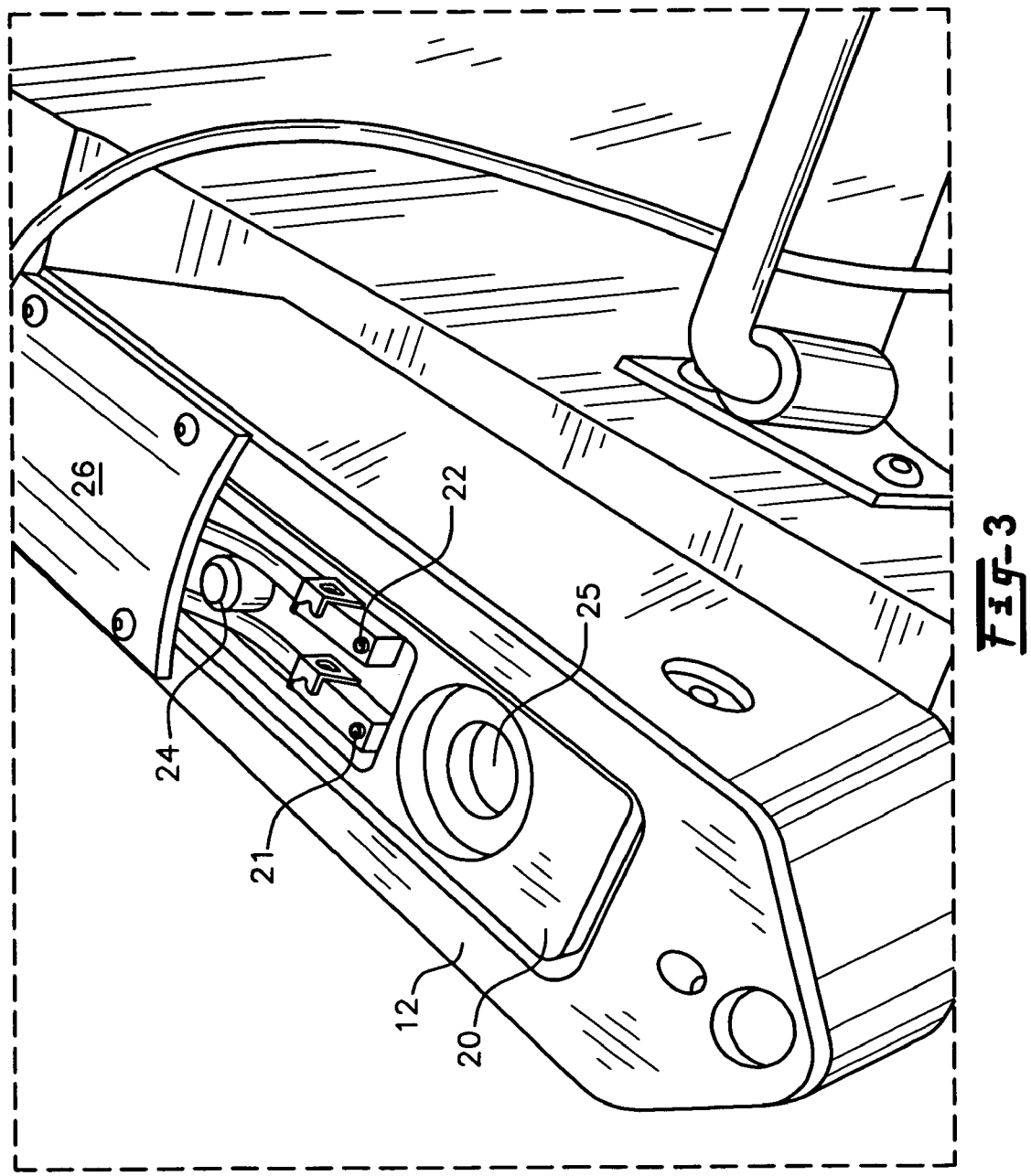
FIG. 3 is a close-up of the anvil with the turret table removed which shows bearing means for receiving an axle which extends below the turret table. The two position-indicating sensors are also shown.
Figure 5:
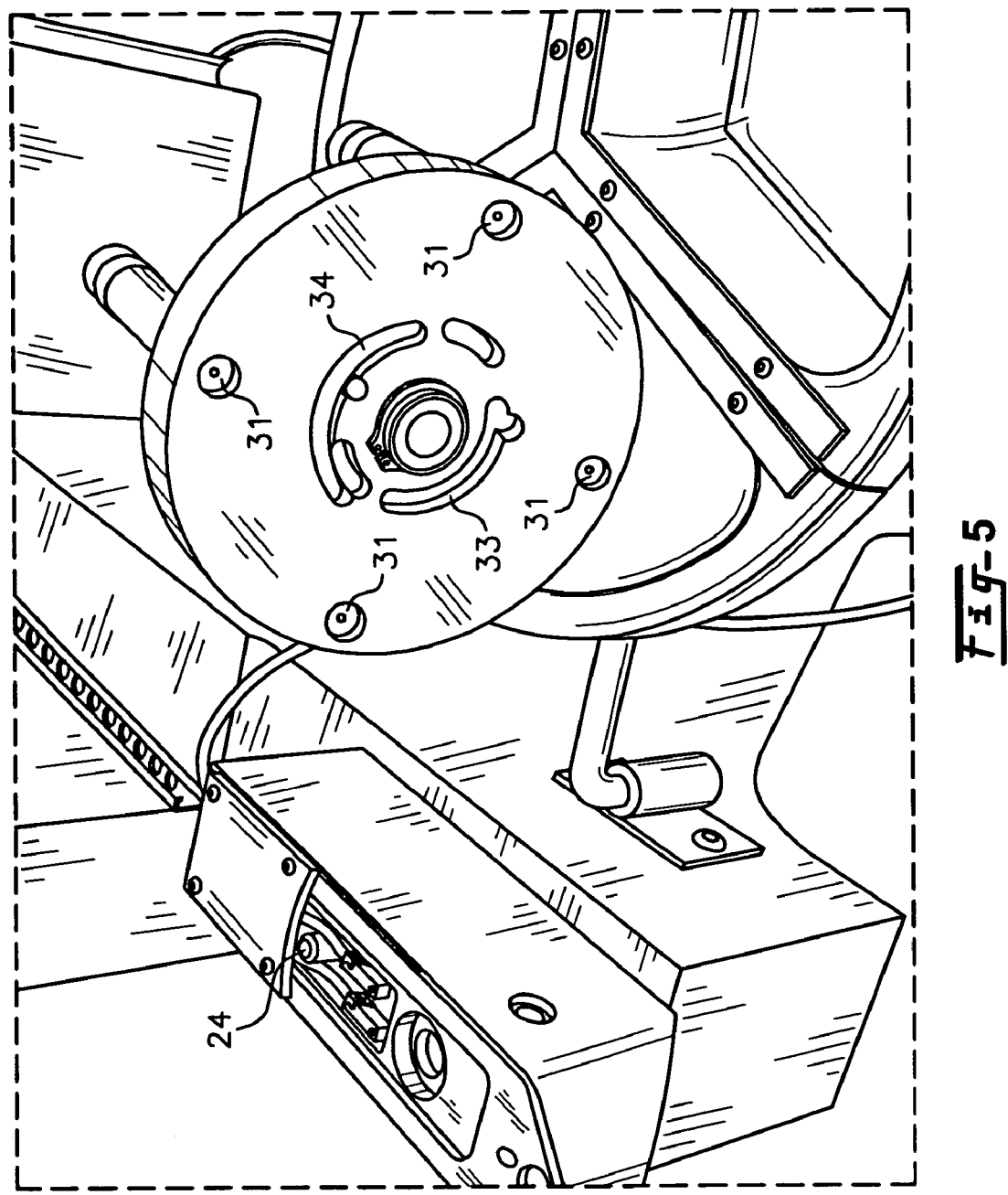
FIG. 5 shows a view of the underside of the turret table and the various grooves along two sensor tracks which provide table position signals.

Referring now to FIG. 3, the anvil housing assembly 12 carries within it an insert 20 which holds magnetic induction type sensors 21 and 22 and also supports the axle of the turret table in bore 25. The sensors which read the encoding structures on the bottom of the table are covered by the table and therefore protected from the industrial environment above. In this figure, the table locking mechanism which includes an index pin 24 is also shown. In the locked position, the index pin extends upward into one of four circular wells on the bottom of the turret table as shown in FIG. 5. In the preferred embodiment, the index pin is biased by spring means upwardly into the locking position. Controller software signals a pneumatic actuator (not shown) that moves the pin downward and releases the table when the table is ready to be moved to the next indexed position. Cover plate 26 extends across the top of the anvil housing to cover the components not covered by the turret table.

Figure 4:
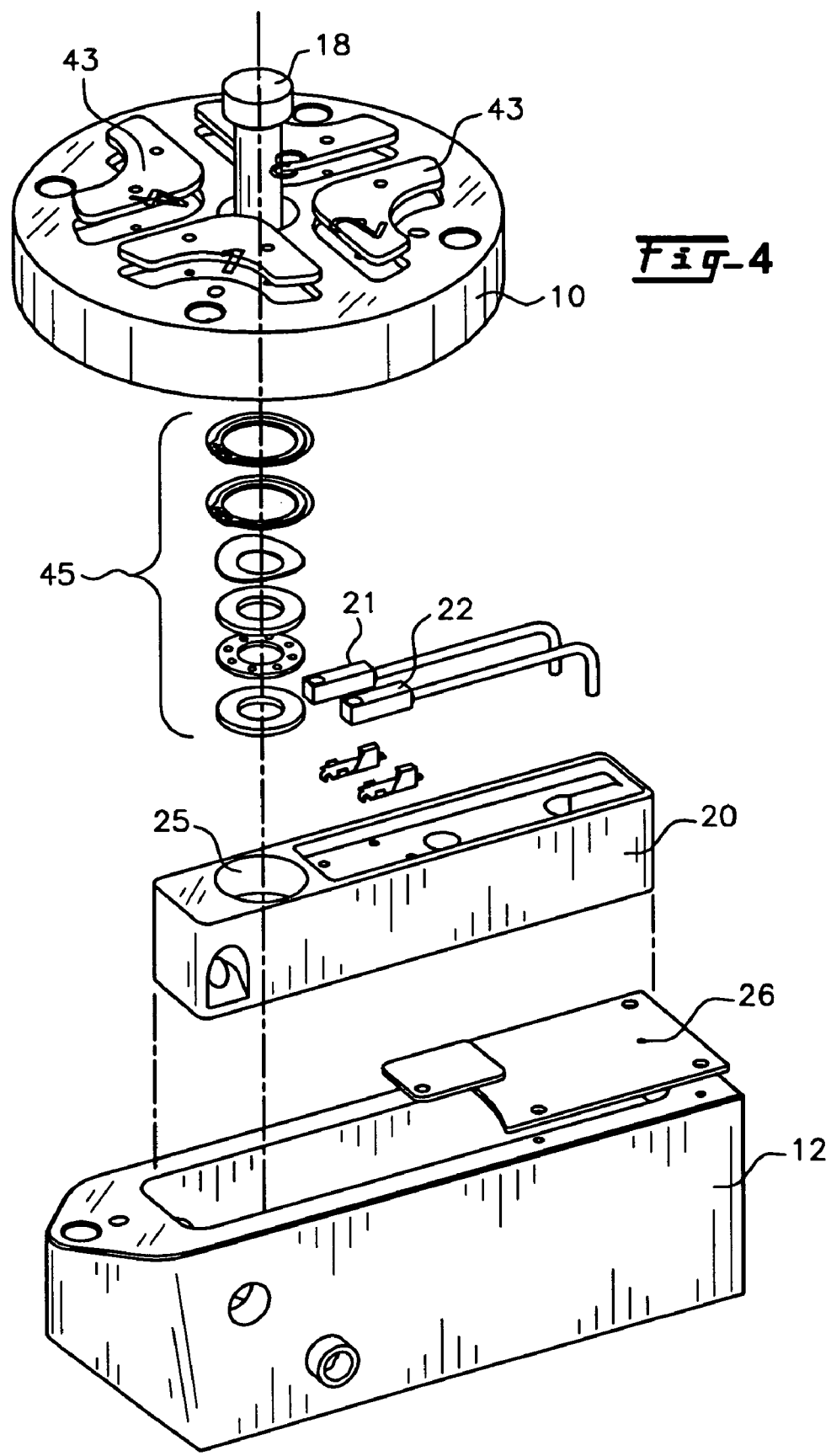
FIG. 4 shows an exploded isometric view of the turret table sensor insert and anvil housing which comprise the main components of the invention.

A more detailed assembly drawing of the various structures previously discussed is shown in FIG. 4. It can be seen from this illustration that the present invention provides a tool change system with an uncomplicated design that has very few parts. Only two sensors are used for the index positioning system which is therefore extremely rugged especially since the sensed features are merely grooves on the bottom of the turret table. The major components of the invention are mounted to a modular insert 20 that is secured within the anvil housing. Axle 18 is fitted to the turret table 10 and extends downward through washer and bearing assembly 45 being received in bore 25 of the anvil insert 20. The sensors are also secured to the anvil insert and the entire assembly is fastened to the anvil housing 12 being protected by cover plate 26. This design permits easy access to all components of the invention and allows simplified repair and ease of maintenance. Colored panels 43 adjacent each of the tools may be employed to color-code each tool position. The table color-coding may correspond to color-coding of the fastener supply to ensure that the correct fastener gets delivered only to the proper tool. The appropriate color may also be displayed or referenced on an operator display screen interface which is generated by the controller software.

Referring now to FIG. 5, details of the bottom of the turret table are depicted. Arcuate grooves on the bottom of the table provide features to which the sensors respond. The grooves are located along two concentric circular tracks of different diameter. As shown in this drawing, groove 33 lies along a portion of an inner track and groove 34 lies along a portion of an outer track. Four circular wells 31 are located directly beneath each tool position and these recesses cooperate with the index pin 24 on the anvil assembly to properly locate the turret table in each of its four working positions.

The arcuate groove pattern on the bottom of the turret table provides the timing of the output signals from the sensors. One of the novel features of the invention is the turret table position-sensing decoding system which is achieved by the two magnetic induction sensors that "read" these grooves which are cut into the bottom of the turret table along two concentric circular tracks of different radii. The sensors detect the proximity of the table, i.e. the absence or presence of a groove adjacent the sensor. Hence, the signal from each sensor changes as a transition occurs from the grooved to the non-grooved areas of the table as they pass closely above it. This change of state is read as either an "on" or an "off" condition in the logic program illustrated in FIG. 6. In order to determine the four absolute positions of the table at each tool position or station 90 degrees apart, the stations are assigned the combined signal states from the sensors at points when sensors A and B are either both "off" or both "on". As described in FIG. 6, the decoding logic also relies on recording the state just previous to reaching these points. FIG. 7 is a timing chart which shows the change of state table positions provided by the two sensors labeled A and B when grooves are placed and decoded according to the invention. The bars in the chart correspond to the location of the grooves adjacent each sensor as the turret table is rotated.

The present invention operates as follows. The invention is preferably used on a punch press which includes a touch screen interface that displays menus and accepts selections from the operator. By way of example, the operating system preferably used with the invention will have four stations of the turret table which are numbered and colored as for example number 1—Green, 2—Blue, 3—Yellow, and 4—Red. At each station separated by 90 rotational degrees of the turret table, a different anvil is located appropriate to a particular type of fastener to be installed.

After a "set-up" function is selected, the touch screen initiates a "tooling selection" that prompts the operator to select the desired tool feed sequence to be run at, for example, Station 1—Green. The tooling sequence can be automatic feed of nuts, studs, stand-offs, or double stroke nuts, or the tooling sequence can just be manual feed by the operator. The next screen displayed is titled "Size and Material" and prompts the operator to select the size fastener being installed at Station 1—Green and the material of the workpiece. This information is used to suggest a starting installation force for this station. The next screen displayed is titled "Job Set-Up" which prompts the operator to enter the quantity of fasteners being installed at each station, the installation force and dwell time for each of the four stations.

When all four stations are programmed, the next screen displayed is entitled "Locate Table" that prompts the operator to rotate the table to Station 1—Green if it is not already in that position. The press controller monitors the state of the two sensors under the table to determine the rotational location as explained above. When the table has arrived at the target station, the press controller releases the spring-loaded index pin which then extends upward into the index recess on the underside of the table into the anvil hole opposite the station. The index pin locks the table in the precise location for installation and prevents the table from rotating. When the controller senses that the table is at the correct station, the controller software proceeds to display the next screen, a "Safety Set-Up" screen, which prompts the operator to operate the foot pedal so the press controller can learn the safe position of the ramp to perform an install. Next, a "Run Mode" screen is displayed which includes running information for the selected station including station status, the fastener installation count for the station, the fastener's installation count for the workpiece, and other information. Installation of the fastener then proceeds until the run at the selected station is completed.

It should be understood that there may be other modifications and changes to the present invention that will be obvious to those of skill in the art from the foregoing description, however, the present invention should be limited only by the following claims and their legal equivalents.

What is claimed is:

1. A rotary tool holder for a press, comprising:
a press having an anvil assembly with means for rotatably mounting a substantially vertical axle;
a rotary turret table affixed to the axle and mounted above said anvil; and
a plurality of structurally different vertically-extending tools rigidly affixed to a top side of said turret table, said turret table rotatable to a plurality of working positions defined by the points of rotation of said turret table where each of said plurality of different tools is selectively held in one of the working positions of the turret directly beneath an upper tool of said press, each tool for a different type of workpiece;
wherein said anvil assembly further includes sensors responsive to position-locating means on a bottom side of said table for indicating which working position of the table associated with each different tool is operative, wherein said position locating means is arcuate grooves in the bottom side surface of said table.

2. The tool holder of claim 1 wherein said anvil assembly further includes an index pin engageable with recesses in the bottom surface of said table when said table is in each of said working positions.

3. The tool holder of claim 1 wherein the position locating means is integral with said table.

4. The tool holder of claim 1 wherein said anvil assembly includes a housing secured to a lower jaw of a C-frame punch press.

5. The tool holder of claim 1 further including a controller electrically connected to sensors for actuating the index pin into engagement with said recesses in said table when said sensors signal said controller that said table is in one of the working positions.

6. The tool holder of claim 1 wherein said sensors are magnetic induction sensors.

7. The tool holder of claim 6 wherein said grooves are located along two concentric circular tracks.

8. The tool holder of claim 1 wherein each of said tools are color-coded.

9. The tool holder of claim 8 wherein said color coding is provided by colored panels located on the top side of said turret table adjacent each of the tools.

* * * * *